United States Patent
Serban et al.

(10) Patent No.: US 10,139,490 B2
(45) Date of Patent: Nov. 27, 2018

(54) FAULT TOLERANT POWER LIFTGATE OBSTRUCTION DETECTION SYSTEM

(71) Applicant: GM Global Technology Operations LLC, Detroit, MI (US)

(72) Inventors: Doru N. Serban, Richmond Hill (CA); Brian Norman Orr, Chesterfield, MI (US); Norman J. Weigert, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 375 days.

(21) Appl. No.: 15/073,019

(22) Filed: Mar. 17, 2016

(65) Prior Publication Data

US 2017/0269210 A1 Sep. 21, 2017

(51) Int. Cl.
| | | |
|---|---|---|
| *G01S 17/02* | (2006.01) | |
| *E05F 15/43* | (2015.01) | |
| *G06N 3/04* | (2006.01) | |
| *G06N 3/08* | (2006.01) | |
| *G01S 17/88* | (2006.01) | |
| *G01S 7/483* | (2006.01) | |
| *G01S 7/497* | (2006.01) | |

(52) U.S. Cl.
CPC ............ *G01S 17/026* (2013.01); *E05F 15/43* (2015.01); *G01S 7/483* (2013.01); *G01S 7/497* (2013.01); *G01S 17/88* (2013.01); *G06N 3/04* (2013.01); *G06N 3/08* (2013.01); *E05F 2015/435* (2015.01); *E05Y 2400/44* (2013.01); *E05Y 2400/52* (2013.01); *E05Y 2800/41* (2013.01); *E05Y 2900/531* (2013.01)

(58) Field of Classification Search
CPC .......... G01S 17/026; G06N 3/04; G06N 3/06; B60R 21/015; B60R 21/00; E05F 15/42; E05F 15/43; E05F 15/44
USPC ...................................... 250/341.8; 49/26–28
See application file for complete search history.

(56) References Cited

U.S. PATENT DOCUMENTS

| | | | |
|---|---|---|---|
| 6,411,054 B1 * | 6/2002 | Van Wiemeersch | G07C 9/00182 318/266 |
| 7,219,945 B1 * | 5/2007 | Zinn | B60J 5/101 296/56 |
| 2008/0294314 A1 * | 11/2008 | Morris | E05F 5/00 701/49 |

* cited by examiner

Primary Examiner — David Porta
Assistant Examiner — Meenakshi Sahu
(74) Attorney, Agent, or Firm — Reising Ethington, P.C.

(57) ABSTRACT

A system and method detects an obstruction in the path of a vehicle access control member moving from an open position to a closed position. The method includes transmitting a detection signal along an edge of the member towards a reflective surface mounted on the member. The detection signal includes a sequence of pulses having different amplitudes with the amplitudes varying linearly moving from a first pulse to a final pulse of the sequence of pulses. The method further includes receiving a detection response signal corresponding to the detection signal following reflection of the detection signal by one of the reflective surface and the obstruction. The detection response signal includes another sequence of pulses and the method further includes generating an obstruction signal indicating whether the obstruction is in the path of the access control member responsive to differences in amplitude between adjacent pulses in the sequence of pulses.

Figure 1:
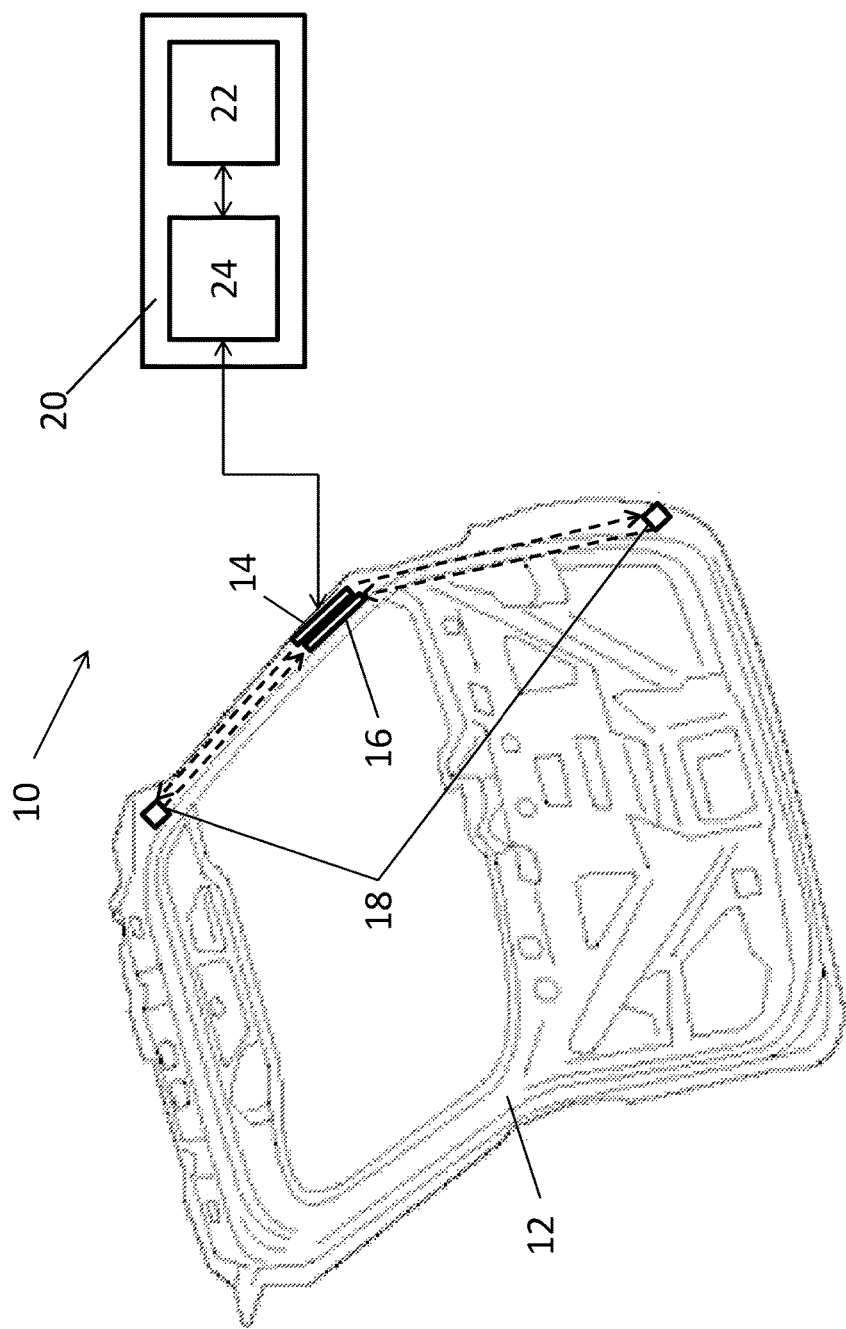

20 Claims, 2 Drawing Sheets ical control systems that control movement of access control members such as doors, trunk lids, liftgates, moonroofs, etc. between open and closed positions as a convenience to a user of the vehicle. For the safety of the user, vehicles also frequently include an obstruction detection system that can detect the presence of the user or an object in the path of movement of the access control member. In this manner, for example, the vehicle is able to prevent injury to the user or damage to an object in the path of movement.

FAULT TOLERANT POWER LIFTGATE OBSTRUCTION DETECTION SYSTEM

FIELD

The present disclosure relates generally to a vehicle system. More specifically, the disclosure relates to a method and system for detecting an obstruction in the path of a vehicle access control member moving from an open position to a closed position and provides an indication of the obstruction without contacting the obstruction.

BACKGROUND

Modern vehicles frequently employ electromechanical control systems that control movement of access control members such as doors, trunk lids, liftgates, moonroofs, etc. between open and closed positions as a convenience to a user of the vehicle. For the safety of the user, vehicles also frequently include an obstruction detection system that can detect the presence of the user or an object in the path of movement of the access control member. In this manner, for example, the vehicle is able to prevent injury to the user or damage to an object in the path of movement.

Most conventional obstruction detection systems rely on contact with the user or object to halt movement of the access control member. In particular, resistive anti-pinching strip sensors are located along the edge of the access control member and, when actuated through contact with an obstruction, cause the control system to reverse movement of the access control member. Contact based obstruction detection systems have a number of drawbacks. They are relatively expensive. They often have difficulty in identifying obstructions where the shape or orientation of the obstruction makes it difficult to adequately deform the sensor or where the material composition of the obstruction has limited friction. The performance of the systems can also vary over time as materials in the sensors age. Further, contact based obstruction detection systems do not result in action until contact with the obstruction has already occurred. Therefore, they provide limited comfort to the vehicle user that the user will not suffer an injury or damage to an object of the user. Some non-contact obstruction detection systems have been developed that project light and detect obstructions through interference with the projected light. Existing systems, however, suffer from a high level of inaccuracy (often failing to detect small obstructions and, at other times, incorrectly indicating the presence of an obstruction) and often resort to the use of relatively expensive sensors to limit the level of inaccuracy.

SUMMARY

According to one embodiment, there is provided a method for detecting an obstruction in the path of a vehicle access control member moving from an open position to a closed position. The method includes transmitting a detection signal along an edge of the vehicle access control member towards a reflective surface mounted on the vehicle access control member. The detection signal includes a first sequence of pulses, each pulse of the first sequence of pulses having a different amplitude and the amplitudes of the first sequence of pulses varying linearly moving from a first pulse of the first sequence of pulses to a final pulse of the first sequence of pulses. The method further includes receiving a detection response signal corresponding to the detection signal following reflection of the detection signal by one of the reflective surface and the obstruction. The detection response signal includes a second sequence of pulses each having an amplitude. The method further includes generating an obstruction signal indicative of whether or not the obstruction is in the path of the vehicle access control member responsive to differences in amplitude between amplitudes of adjacent pulses in the second sequence of pulses.

According to another embodiment, there is provided a method for detecting an obstruction in the path of a vehicle access control member moving from an open position to a closed position. The method includes transmitting a calibration signal along an edge of the vehicle access control member towards a reflective surface mounted on the vehicle access control member and receiving a calibration response signal corresponding to the calibration signal following reflection of the calibration signal by the reflective surface. The method further includes establishing a baseline amplitude responsive to an amplitude of the calibration response signal. The method further includes transmitting a detection signal along the edge of the vehicle access control member towards the reflective surface. The detection signal includes a first sequence of pulses, each pulse of the first sequence of pulses having a different amplitude and the amplitudes of the first sequence of pulses varying linearly moving from a first pulse of the first sequence of pulses to a final pulse of the first sequence of pulses. A baseline pulse between the first pulse and the final pulse has the baseline amplitude. The method further includes receiving a detection response signal corresponding to the detection signal following reflection of the detection signal by one of the reflective surface and the obstruction. The detection response signal includes a second sequence of pulses each having an amplitude. The method further includes generating an obstruction signal indicative of whether or not the obstruction is in the path of the vehicle access control member responsive to differences in amplitude between amplitudes of adjacent pulses in the second sequence of pulses.

According to another embodiment, there is provided a system for detecting an obstruction in the path of a vehicle access control member moving from an open position to a closed position. The system include a signal generator mounted on the vehicle access control member proximate an edge of the vehicle access control member and a signal receiver mounted on the vehicle access control member proximate the edge of the vehicle access control member. The system further includes a reflective surface mounted on the vehicle access control member proximate the edge of the vehicle access control member. The system further includes a controller configured to cause the signal generator to transmit a detection signal along the edge of the vehicle access control member towards the reflective surface. The detection signal includes a first sequence of pulses, each pulse of the first sequence of pulses having a different amplitude and the amplitudes of the first sequence of pulses varying linearly moving from a first pulse of the first sequence of pulses to a final pulse of the first sequence of pulses. The signal receiver is configured to receive a detection response signal corresponding to the detection signal following reflection of the detection signal by one of the reflective surface and the obstruction. The detection response signal includes a second sequence of pulses each having an amplitude. The controller is further configured to generate an obstruction signal indicative of whether or not the obstruction is in the path of the vehicle access control member responsive to differences in amplitude between amplitudes of adjacent pulses in the second sequence of pulses.

DRAWINGS

Figure 2:
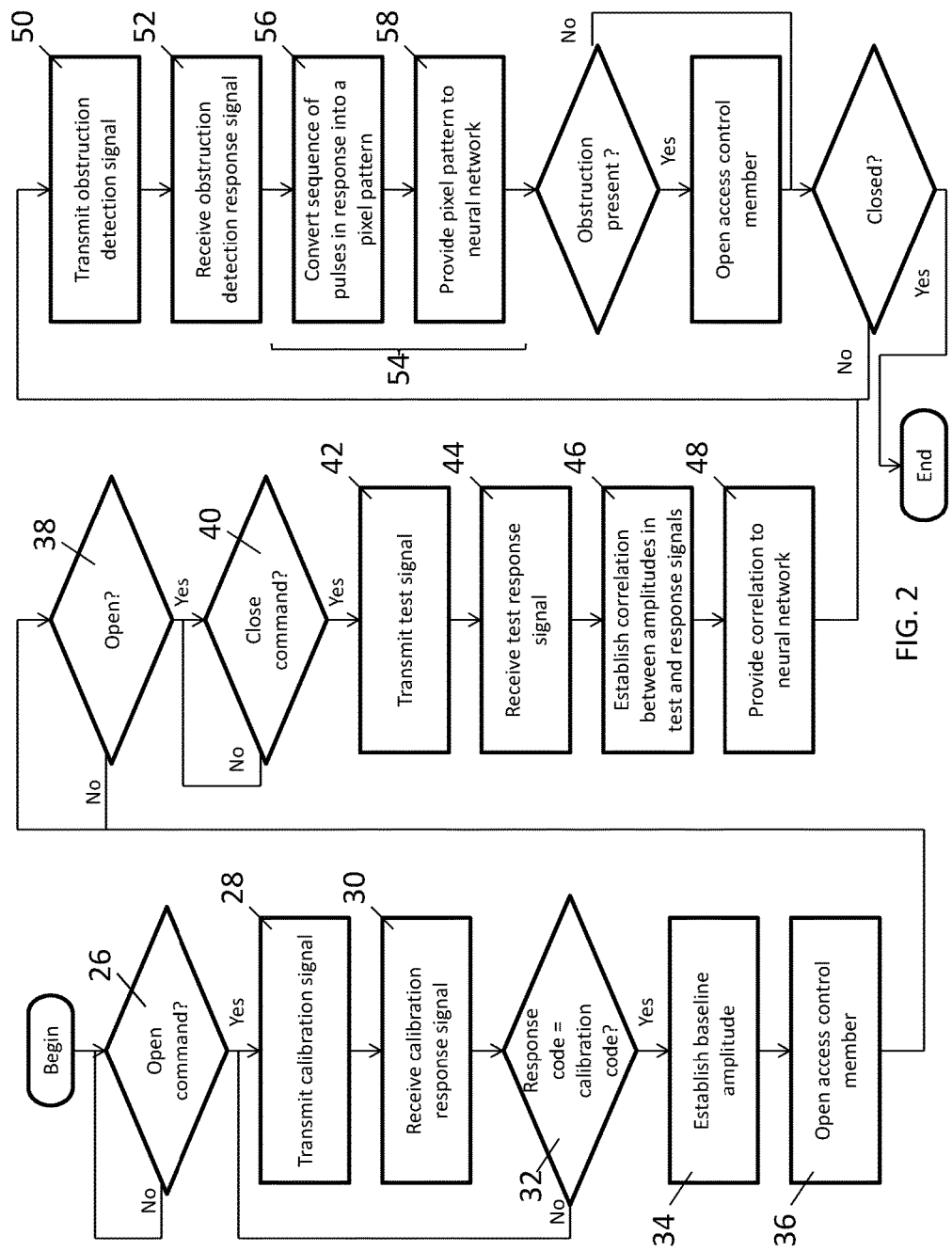

Preferred exemplary embodiments will hereinafter be described in conjunction with the appended drawings, wherein like designations denote like elements, and wherein:

FIG. 1 is a schematic view of a vehicle access control member including one embodiment of a system for detecting an obstruction in the path of the vehicle access control member moving from an open position to a closed position; and, FIG. 2 is a flowchart illustrating embodiments of a method for detecting an obstruction in the path of a vehicle access control member moving from an open position to a closed position.

DESCRIPTION

The system and method described herein may be used to detect an obstruction in the path of a vehicle access control member such as a door, window, moonroof, trunk lid or liftgate that is moving from an open position to a closed position without requiring contact with the obstruction. In particular, the system and method determine whether an obstruction is present by transmitting a signal, such an infrared signal, having a sequence of pulses with linearly varying amplitudes towards a reflective surface. A response signal corresponding to the transmitted signal is received following reflection of the transmitted signal by either the reflective surface or an obstruction. The response signal also includes a sequence of pulses. The system and method examine differences in the amplitudes of adjacent pulses in the sequence of pulses of the response signal to determine whether an obstruction is present and do so in a manner that provides greater accuracy than existing non-contact obstruction detection systems.

Referring now to the drawings wherein like reference numerals are used to identify identical components in the various views, FIG. 1 illustrates one embodiment of a system 10 for detecting an obstruction in the path of a vehicle access control member 12 moving from an open position to a closed position. In the illustrated embodiment member 12 comprises a vehicle liftgate. It should be understood, however, that the system and method disclosed herein may be applied to other access control members that control access to a vehicle compartment (such as the vehicle cabin or a storage compartment) including doors, windows, sunroofs, moon roofs, convertible roofs, trunk lids, hatches, tailgates, etc. Member 12 moves between an open position where member 12 permits access to a vehicle compartment and a closed position where member 12 prohibits access to the vehicle compartment. Member 12 may be joined to the vehicle body at a hinge such that member 12 rotates between the open and closed positions or may be configured for translational movement along guide rails for example. System 12 may include one or more signal generators 14, one or more signal receivers 16, one or more reflectors 18 and a controller 20.

Signal generators 14 are mounted on member 12 and are configured to generate signals that are transmitted along edges of member 12 towards reflectors 18. As discussed in greater detail below, the signals may be generated for various purposes including calibration of the system and detecting obstructions. Each signal may include a sequence of pulses and the amplitude of the pulses may vary as discussed in more detail below. Signal generators 14 may comprise infrared signal generators such an infrared light emitting diodes capable of generating infrared signals (i.e. signals having a wavelength of between about 750 nm to about 1 mm). It should be understood, however, that other forms of signal generators could potentially be used including ultrasound signal generators.

Signal receivers 16 are mounted on member 12 and are configured to receive signals generated by reflection of the signals transmitted by signal generators 14. In the absence of an obstruction, for example, signal receivers 16 are configured to receive signals transmitted by generators 14 after reflection by reflectors 18. In the presence of an obstruction, signal receivers 16 are configured to receive signals transmitted by generators 14 after reflection by the obstruction. Signal receivers 16 may comprise infrared signal receivers such as photodiodes or phototransistors. It should be understood, however, that the form of receivers 16 will correspond to the form of signal generators 14 (i.e., if signal generator 14 comprises an ultrasound transducer, signal receiver 16 will likewise comprise an ultrasound transducer). A signal receiver 16 may be packaged with a signal generator in a single module that may also include controller 20. Further, the same module may include multiple signal generators 14 and signal receivers 16 depending on the type and shape of member 12.

Reflectors 18 are mounted on member 12 and are provided to reflect signals generated by signal generators 14 in the absence of an obstruction so that the signals are received by signal receivers 16. Reflectors 18 may comprise mirrors or another structure that provides a reflective surface. The use of reflectors 18 is advantageous because they can be placed at the extreme ends of member 12 and it is often difficult to route electrical conductors to these locations and to drain water away from these locations. Using reflectors 18 therefore enables system 10 to effectively detect obstructions along the entire perimeter of an access control member 12. In the illustrated embodiment, reflectors 18 are mounted along side edges of upper and lower portions of member 12 such that one reflector 18 is located near one end of member 12 where member 12 is joined to the vehicle body (i.e. a hinge point) and another reflector 18 is located at the opposite end of member 12 (i.e., the portion of member 12 that travels the greatest distance moving between the open and closed positions). In the case of a liftgate as shown in the illustrated embodiment, obstructions may be detected between the hinge point and the beltline of the liftgate (where the risk of injury is actually greatest) and between the beltline and the lowermost edge of the liftgate (where customers often perceive the risk of injury is greatest).

Controller 20 is provided to control the generation of signals by signal generators 14 and to interpret signals received by signal receivers 16 in order to determine whether an obstruction is present in the path of travel of access control member 12. Controller 20 may include a variety of electronic processing devices, memory devices, input/output (I/O) devices, and/or other known components, and may perform various control and/or communication related functions. In an exemplary embodiment, controller 20 includes an electronic memory device 22 that stores look up tables or other data structures, software programs, etc. Controller 20 may also include an electronic processing device 24 (e.g., a microprocessor, a microcontroller, an application specific integrated circuit (ASIC), etc.) that executes instructions for software, firmware, programs, algorithms, scripts, etc. that are stored in memory device 20. Depending on the particular embodiment, controller 20 may be a stand-alone vehicle electronic module, it may be incorporated or included within another vehicle electronic module (such as a module for controlling movement of member 12), or it may be part of a larger network or system such as a body control module. Controller 20 may be electronically connected to other vehicle devices, modules and systems via a vehicle communications bus or other communication means and can interact with them when required. In accordance with some embodiments, for example, controller 20 is configured to communicate with a control system for opening and closing member 12 so that controller 20 is aware of the position of member 12 and commands to change the position of member 12.

In accordance with various embodiments disclosed herein, controller 20 is configured with appropriate programming instructions or code (i.e., software) to perform several steps in a method for detecting an obstruction in the path of vehicle access control member 10 as it moves from an open position to a closed position. The code may be stored in memory device 22 of controller 20 and may be uploaded to memory device 22 from, a conventional computer storage medium. Referring now to FIG. 2, the method may begin with the step 26 of monitoring control signals for access control member 12 for a command to open member 12 when member 12 is in a closed position. Once a command to open member 12 is detected, the method may continue with several steps intended to calibrate system 10 and insure a sufficient level of reflection by reflectors 18 of signals generated by signal generators 14. These steps may take place before member 12 is actually opened.

In step 28, controller 20 directs signal generator 14 to transmit a calibration signal along an edge of the member 12 towards a reflective surface mounted on member 12 such as reflector 18. The calibration signal includes a sequence of pulses. The pulses have a predetermined amplitude and may have the same amplitude. The pulses may further be arranged (e.g., by varying the times at which the pulses are emitted such that presence of a pulse is interpreted as a first logic level and the absence of a pulse is interpreted as a second logic level) to form a calibration code. In step 30, controller 20 receives a calibration response signal from signal receiver 16 following reflection of the calibration signal by reflector 18. The calibration response signal will also include a sequence of pulses forming a response code which, in the absence of interference or signal noise, should correspond to the calibration code in the sequence of pulses from the calibration signal.

In step 32, controller 20 determines whether the response code formed by the sequence of pulses in the calibration response signal corresponds to the calibration code. If a correspondence exists, in step 34 controller establishes a baseline amplitude responsive to the amplitude of the calibration response signal and, in particular, the amplitude of one or more pulses in the calibration response signal. The calibration steps are intended to compensate for reduced reflectivity of reflectors 18 due to, for example, an accumulation of dust or dirt over time. The amplitude in the pulses of the calibration response signal are indicative of the degree of reflectivity or clarity of reflectors 18 and the baseline amplitude for pulses in the obstruction detection signals (discussed below) can be established based on the degree of reflectivity to account for changes in reflectivity. The baseline amplitude may be established by determining a gain factor for a predetermined amplitude responsive to the difference between the amplitude of a pulse in the calibration response signal and a desired amplitude. Alternatively, multiple calibration signals having pulses that gradually increase in amplitude can be transmitted until a calibration response signal is received having a pulse with an amplitude meeting a desired amplitude. The baseline amplitude can then be set at the amplitude of the pulses in the corresponding calibration signal. The use of pulse amplitudes to evaluate reflection of transmitted signals as described herein is advantageous because it allows system 10 to address perturbations in the received signals from solar radiation, ambient spectral radiation, neon light and parasitic infrared emissions. If the response code formed by the sequence of pulses in the calibration response signal does not correspond to the calibration code, the calibration response signal may be ignored. In some embodiments, steps 28, 30, 32 may be repeated until a correspondence is detected. In other embodiments, the most recently established baseline amplitude may be used. In some embodiments, an alert (e.g., audio or visual) may be provided to the user of the vehicle through a driver information center in the vehicle cabin.

After calibration of system 10 is complete, controller 22 may be configured in step 36 to generate a signal to a control system for member 12 indicating that the calibration process is complete and that member 12 may be opened. It should be understood, however, that the control system for member 12 may open member 12 independently of this signal in other embodiments. Thereafter, controller 22 may be configured in steps 38, 40 to monitor control signals for access control member 12 to determine when member 12 has reached an open position and, subsequently, when a command to close member 12 has been received.

After a command to close member 12 is received and member 12 begins moving from the open position to the closed position, controller 20 may be configured, in step 42, to transmit a test signal along the edge of member 12 towards reflector 18. The test signal includes a sequence of pulses. Each pulse of the sequence of pulses has a different amplitude. Further, the amplitudes of the pulses vary linearly moving from a first pulse in the sequence of pulses to a final pulse in the sequence of pulses. A baseline pulse between the first and final pulse may have the baseline amplitude established in step 34. In one embodiment, the sequence of pulses includes nine pulses with a baseline pulse having the baseline amplitude, four pulses have amplitudes less than the baseline amplitude and four pulses having amplitudes greater than the baseline amplitude. The difference in amplitude between adjacent pulses in the sequence of pulses is constant to produce a linear variation in the amplitudes of the pulses.

In step 44, controller 20 is configured to receive a test response signal corresponding to the test signal following reflection of the test signal by reflector 18. The test response signal will include a sequence of pulses corresponding to the sequence of pulses in the test signal and each of the pulses in the test response signal will have an amplitude. In steps 46 and 48, controller 20 is configured to establish a correlation between the amplitudes of pulses in the test signal and the amplitudes of corresponding pulses in the test response signal and to provide this correlation to an artificial neural network that will be used to generate an output corresponding to the obstruction signal in subsequent steps. The correlation between the pulses of the test and test response signals is intended to provide an indication of the spectral response of an unobstructed linear reflection from reflector 18.

As member 12 moves from its open position to its closed position, controller 20 repeats a series of steps to determine whether an obstruction is present in the path of movement of member 12. In step 50, controller 20 is configured to cause signal generator 14 to transmit a detection signal along the edge of member 12 towards reflector 18. The detection signal again includes a sequence of pulses. Each of the pulses again has a different amplitude and the amplitudes of the pulses in the sequence of pulses vary linearly moving from a first pulse in the sequence of pulses to a final pulse in the first sequence of pulses. A baseline pulse between the first and final pulse may again have the baseline amplitude established in step 34. In one embodiment, the sequence of pulses includes nine pulses with one pulse having the baseline amplitude, four pulses have amplitudes less than the baseline amplitude and four pulses having amplitudes greater than the baseline amplitude. The difference in amplitude between adjacent pulses in the sequence of pulses is constant to produce a linear variation in the amplitudes of the pulses.

In step 52, controller 20 is configured to receive a detection response signal corresponding to the detection signal following reflection of the detection signal by either reflector 18 or an obstruction. The detection response signal will again include a sequence of pulses each having an amplitude. In step 54, controller 20 is configured to generate an obstruction signal indicative of whether or not an obstruction is in the path of movement of member 12. Controller 20 does so in response to differences in amplitude between the amplitudes of adjacent pulses in the sequence of pulses in the detection response signal. In general, in the absence of an obstruction, the amplitudes of the pulses in the detection response signal should vary linearly as in the detection signal. If the amplitudes do not vary linearly, there is an indication that an obstruction may be present.

In accordance with one aspect of the present invention, controller 20 does not simply compare the differences in amplitude among adjacent pulses to expected values. Rather, controller 20 implements an artificial neural network to look at patterns in the differences in amplitude among adjacent pulses and evaluate that pattern relative to knowledge gained while the network was trained and subsequently used during operation of the vehicle. In this manner, the system and method disclosed herein allow an obstruction to be identified responsive to interference with the transmitted signal by the obstruction despite the presence of interference by moving vehicle components including those associated with member 12. As part of this process, step 54 may include the substep 56 of converting the sequence of pulses in the detection response signal into a pixel pattern having a plurality of elements. Each element in the pixel pattern corresponds to one of the sequence of pulses and has an intensity value corresponding to the amplitude of the corresponding pulse. The intensity value is capable of assuming a plurality of values including a maximum intensity value equivalent to a color and a minimum intensity value equivalent to a lack of color. In substep 58, this pixel pattern is provided as inputs to the input units of the artificial neural network. Hidden units in the neural network receive the inputs from the input units and apply weights to the inputs. These weights are based, in part, on the correlation of the test and test response signals referenced above as well as back propogation during training of the network. The hidden units provide inputs to output units of the neural network which generate outputs indicative of whether or not an obstruction is present and that are therefore used by controller 20 to generate the obstruction signal.

If the obstruction signal generated by controller 20 indicates that no obstruction is present, member 12 will continue to move towards the closed position. Controller 20 may be configured to repeat steps 50, 52, 54 a plurality of times as member 12 moves from the open position to the closed position. The steps may be repeated a set number of times or at predetermined intervals during movement of member 12 to the closed position. If the obstruction signal indicates that an obstruction is present, the control system for member 12 may be configured to stop and/or reverse the movement of member 12.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for detecting an obstruction in the path of a vehicle access control member moving from an open position to a closed position, comprising the steps of:
   transmitting a detection signal along an edge of the vehicle access control member towards a reflective surface mounted on the vehicle access control member, the detection signal including a first sequence of pulses, each pulse of the first sequence of pulses having a different amplitude and the amplitudes of the first sequence of pulses varying linearly moving from a first pulse of the first sequence of pulses to a final pulse of the first sequence of pulses;
   receiving a detection response signal corresponding to the detection signal following reflection of the detection signal by one of the reflective surface and the obstruction, the detection response signal including a second sequence of pulses each having an amplitude; and,
   generating an obstruction signal indicative of whether or not the obstruction is in the path of the vehicle access control member responsive to differences in amplitude between amplitudes of adjacent pulses in the second sequence of pulses.

2. The method of claim 1, further comprising the steps of:
   transmitting a test signal along the edge of the vehicle access control member towards the reflective surface, the test signal including a third sequence of pulses, each pulse of the third sequence of pulses having a different amplitude and the amplitudes of the third sequence of pulses varying linearly moving from a first pulse of the third sequence of pulses to a final pulse of the third sequence of pulses;

receiving a test response signal corresponding to the test signal following reflection of the test signal by the reflective surface, the test response signal including a fourth sequence of pulses each having an amplitude;

establishing a correlation between the amplitudes of pulses in the third sequence of pulses and the amplitudes of corresponding pulses in the fourth sequence of pulses; and, providing the correlation to an artificial neural network configured to generate an output corresponding to the obstruction signal.

3. The method of claim 2 wherein the steps of transmitting the test signal and receiving the test response signal occur after the vehicle access control member begins moving from the open position to the closed position.

4. The method of claim 3 wherein the steps of transmitting the test signal, receiving the test response signal, establishing a correlation, and providing the correlation to the artificial neural network occur before the step of transmitting the detection signal.

5. The method of claim 1 wherein the generating step includes the substeps of:

converting the second sequence of pulses into a pixel pattern having a plurality of elements, each element in the pixel pattern corresponding to one of the second sequence of pulses and having an intensity value corresponding to the amplitude of the corresponding pulse, the intensity value capable of assuming a plurality of values including a maximum intensity value equivalent to a color and a minimum intensity value equivalent to a lack of color; and, providing the pixel pattern as an input to an artificial neural network configured to generate an output corresponding to the obstruction signal.

6. The method of claim 1 wherein the detection signal comprises an infrared signal.

7. A method for detecting an obstruction in the path of a vehicle access control member moving from an open position to a closed position, comprising the steps of:

transmitting a calibration signal along an edge of the vehicle access control member towards a reflective surface mounted on the vehicle access control member;

receiving a calibration response signal corresponding to the calibration signal following reflection of the calibration signal by the reflective surface;

establishing a baseline amplitude responsive to an amplitude of the calibration response signal;

transmitting a detection signal along the edge of the vehicle access control member towards the reflective surface, the detection signal including a first sequence of pulses, each pulse of the first sequence of pulses having a different amplitude and the amplitudes of the first sequence of pulses varying linearly moving from a first pulse of the first sequence of pulses to a final pulse of the first sequence of pulses, a baseline pulse between the first pulse and the final pulse having the baseline amplitude;

receiving a detection response signal corresponding to the detection signal following reflection of the detection signal by one of the reflective surface and the obstruction, the detection response signal including a second sequence of pulses each having an amplitude; and, generating an obstruction signal indicative of whether or not the obstruction is in the path of the vehicle access control member responsive to differences in amplitude between amplitudes of adjacent pulses in the second sequence of pulses.

8. The method of claim 7 wherein the calibration signal includes a third sequence of pulses, the third sequence of pulses forming a calibration code and further comprising the step of determining whether :the calibration response signal includes a fourth sequence of pulses forming a response code corresponding to the calibration code wherein the establishing step is performed only when the response code corresponds to the calibration code.

9. The method of claim 7 wherein the steps of transmitting the calibration signal, receiving the calibration signal and establishing the baseline amplitude are performed while the vehicle access control member is in the closed position.

10. The method of claim 9 wherein the steps of transmitting the calibration signal, receiving the calibration signal and establishing the baseline amplitude are performed after receipt of a command to move the vehicle access control member from the closed position to the open position.

11. The method of claim 7, further comprising the steps of:

transmitting a test signal along the edge of the vehicle access control member towards the reflective surface, the test signal including a third sequence of pulses, each pulse of the third sequence of pulses having a different amplitude and the amplitudes of the third sequence of pulses varying linearly moving from a first pulse of the third sequence of pulses to a final pulse of the third sequence of pulses, a baseline pulse of the third sequence of pulses between the first pulse of the third sequence of pulses and the final pulse of the third sequence of pulses having the baseline amplitude;

receiving a test response signal corresponding to the test signal following reflection of the test signal by the reflective surface, the test response signal including a fourth sequence of pulses each having an amplitude;

establishing a correlation between the amplitudes of pulses in the third sequence of pulses and the amplitudes of corresponding pulses in the fourth sequence of pulses; and, providing the correlation to an artificial neural network configured to generate an output corresponding to the obstruction signal.

12. The method of claim 11 wherein the steps of transmitting the test signal and receiving the test response signal occur after the vehicle access control member begins moving from the open position to the closed position.

13. The method of claim 12 wherein the steps of transmitting the test signal, receiving the test response signal, establishing a correlation, and providing the correlation to the artificial neural network occur before the step of transmitting the detection signal.

14. The method of claim 7 wherein the generating step includes the substeps of:

converting the second sequence of pulses into a pixel pattern having a plurality of elements, each element in the pixel pattern corresponding to one of the second sequence of pulses and having an intensity value corresponding to the amplitude of the corresponding pulse, the intensity value capable of assuming a plurality of values including a maximum intensity value equivalent to a color and a minimum intensity value equivalent to a lack of color; and, providing the pixel pattern as an input to an artificial neural network configured to generate an output corresponding to the obstruction signal.

15. The method of claim 7 wherein the calibration signal and the detection signal comprise infrared signals.

16. A system for detecting an obstruction in the path of a vehicle access control member moving from an open position to a closed position, comprising:
- a signal generator mounted on the vehicle access control member proximate an edge of the vehicle access control member;
- a signal receiver mounted on the vehicle access control member proximate the edge of the vehicle access control member;
- a reflective surface mounted on the vehicle access control member proximate the edge of the vehicle access control member; and
- a controller configured to:
  - cause the signal generator to transmit a detection signal along the edge of the vehicle access control member towards the reflective surface, the detection signal including a first sequence of pulses, each pulse of the first sequence of pulses having a different amplitude and the amplitudes of the first sequence of pulses varying linearly moving from a first pulse of the first sequence of pulses to a final pulse of the first sequence of pulses, the signal receiver configured to receive a detection response signal corresponding to the detection signal following reflection of the detection signal by one of the reflective surface and the obstruction, the detection response signal including a second sequence of pulses each having an amplitude; and,
  - generate an obstruction signal indicative of whether or not the obstruction is in the path of the vehicle access control member responsive to differences in amplitude between amplitudes of adjacent pulses in the second sequence of pulses.

17. The system of claim 16 wherein the controller is further configured to:
- cause the signal generator to transmit a test signal along the edge of the vehicle access control member towards the reflective surface, the test signal including a third sequence of pulses, each pulse of the third sequence of pulses having a different amplitude and the amplitudes of the third sequence of pulses varying linearly moving from a first pulse of the third sequence of pulses to a final pulse of the third sequence of pulses, the signal generator configured to receive a test response signal corresponding to the test signal following reflection of the test signal by the reflective surface, the test response signal including a fourth sequence of pulses each having an amplitude;
- establish a correlation between the amplitudes of pulses in the third sequence of pulses and the amplitudes of corresponding pulses in the fourth sequence of pulses; and,
- provide the correlation to an artificial neural network configured to generate an output corresponding to the obstruction signal.

18. The system of claim 16 wherein the controller is further configured to:
- convert the second sequence of pulses into a pixel pattern having a plurality of elements, each element in the pixel pattern corresponding to one of the second sequence of pulses and having an intensity value corresponding to the amplitude of the corresponding pulse, the intensity value capable of assuming a plurality of values including a maximum intensity value equivalent to a color and a minimum intensity value equivalent to a lack of color; and,
- provide the pixel pattern as an input to an artificial neural network configured to generate an output corresponding to the obstruction signal.

19. The system of claim 16 wherein the controller is further configured to:
- cause the signal generator to transmit a calibration signal along an edge of the vehicle access control member towards the reflective surface, the signal receiver configured to receive a calibration response signal corresponding to the calibration signal following reflection of the calibration signal by the reflective surface; and,
- establish a baseline amplitude responsive to an amplitude of the calibration response signal
- wherein the first sequence of pulses includes a baseline pulse between the first pulse and the final pulse having the baseline amplitude.

20. The system of claim 19 wherein the calibration signal includes a third sequence of pulses, the third sequence of pulses forming a calibration code and wherein the controller is further configured to determine whether the calibration response signal includes a fourth sequence of pulses forming a response code corresponding to the calibration code, the controller establishing the baseline amplitude only when the response code corresponds to the calibration code.

* * * * *